United States Patent
Knapick et al.

(10) Patent No.: US 6,214,465 B1
(45) Date of Patent: *Apr. 10, 2001

(54) FLOOR ABSORBENT GRANULAR PRODUCT COMPRISING KAOKIN CLAY AND CELLULOSE FIBERS

(75) Inventors: Edward G. Knapick, Ogdensburg; Brent Willemsen, Westfield; Ernest P. Wolfer, Allendale, all of NJ (US)

(73) Assignee: Marcel Paper Mills, Inc., Elmwood Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/357,287

(22) Filed: Jul. 20, 1999

Related U.S. Application Data

(60) Division of application No. 09/042,011, filed on Mar. 13, 1998, now Pat. No. 6,019,873, which is a continuation-in-part of application No. 08/929,601, filed on Sep. 15, 1997, now Pat. No. 5,888,345, which is a continuation-in-part of application No. 08/857,302, filed on May 16, 1997, now Pat. No. 5,807,465, which is a continuation of application No. 08/482,843, filed on Jun. 7, 1995, now abandoned, which is a continuation-in-part of application No. 08/118,186, filed on Sep. 9, 1993, now abandoned.

(51) Int. Cl.[7] ............................. B32B 5/16; D21H 11/00
(52) U.S. Cl. ................... 428/402; 162/109; 162/157.6; 162/181.8; 428/473.5
(58) Field of Search ............................. 162/4, 157.6, 109, 162/189, 181.8, 190; 428/372, 402, 473.5, 400.401

(56) References Cited

U.S. PATENT DOCUMENTS

| | | |
|---|---|---|
| 622,054 | 3/1899 | Marsden . |
| 888,148 | 5/1908 | Kokkenwadel . |
| 892,754 | 7/1908 | May . |
| 907,403 | 12/1908 | Redfearn . |
| 966,060 | 8/1910 | Severns . |
| 1,758,735 | 5/1930 | Conrad . |
| 2,182,274 | 12/1939 | Baker et al. . |
| 2,198,013 | 4/1940 | Olcott . |
| 2,287,759 | 6/1942 | Hardesty et al. . |
| 2,877,599 | 3/1959 | Hebestreet et al. . |
| 2,880,519 | 4/1959 | Pollock . |
| 2,952,866 | 9/1960 | Sackett . |
| 3,003,911 | 10/1961 | Lindstrom et al. . |
| 3,011,876 | 12/1961 | Raistrick . |
| 3,047,453 | 7/1962 | Shook, Jr. . |
| 3,059,615 | 10/1962 | Kuceski et al. . |
| 3,142,862 | 8/1964 | Guldman . |
| 3,188,751 | 6/1965 | Sutton . |
| 3,235,444 | 2/1966 | Kruger . |
| 3,252,785 | 5/1966 | Hoblit . |
| 3,256,857 | 6/1966 | Karras . |
| 3,381,460 | 5/1968 | Sokolowski . |
| 3,449,106 | 6/1969 | Paden et al. . |
| 3,506,536 | 4/1970 | Jacquelin . |
| 3,564,083 | 2/1971 | Fournet et al. . |
| 3,574,050 | 4/1971 | Rice . |
| 3,589,977 | 6/1971 | Fournet . |
| 3,672,945 | 6/1972 | Taylor . |
| 3,675,625 | 7/1972 | Miller et al. . |
| 3,723,321 | 3/1973 | Thomas . |
| 3,724,660 | 4/1973 | Eriksson . |
| 3,747,564 | 7/1973 | Bickoff et al. . |
| 3,789,797 | 2/1974 | Brewer . |
| 3,828,731 | 8/1974 | White . |
| 3,897,301 | 7/1975 | Bauman et al. . |
| 3,900,547 | 8/1975 | Hunt et al. . |
| 3,904,726 | 9/1975 | Jacquelin et al. . |
| 3,916,831 | 11/1975 | Fisher . |
| 3,921,581 | 11/1975 | Brewer . |
| 3,929,446 | 12/1975 | Trocino . |
| 3,942,970 | 3/1976 | O'Donnell . |
| 3,980,050 | 9/1976 | Neubauer . |
| 4,106,991 | 8/1978 | Markussen et al. . |
| 4,108,932 | 8/1978 | Takewell et al. . |
| 4,116,760 | 9/1978 | Kennedy . |
| 4,134,725 | 1/1979 | Büchel et al. . |
| 4,137,029 | 1/1979 | Brooks . |
| 4,148,952 | 4/1979 | Nelson et al. . |
| 4,157,696 | 6/1979 | Carlberg . |
| 4,163,674 | 8/1979 | Been . |
| 4,203,388 | 5/1980 | Cortigene et al. . |
| 4,225,382 | 9/1980 | Kearney et al. . |
| 4,241,001 | 12/1980 | Lamond et al. . |
| 4,263,873 | 4/1981 | Christianson . |
| 4,269,859 | 5/1981 | Morse . |
| 4,277,328 | 7/1981 | Pfalzer et al. . |
| 4,305,345 | 12/1981 | Otoguro . |

(List continued on next page.)

FOREIGN PATENT DOCUMENTS

| | | |
|---|---|---|
| 2090665 | 10/1993 | (CA) . |
| 1 454 743 | 1/1969 | (DE) . |
| 23 58 808 | 6/1975 | (DE) . |
| 30 17 352 | 11/1981 | (DE) . |
| 33 43 965 | 12/1984 | (DE) . |
| 41 30 472 | 3/1993 | (DE) . |
| 0 039 522 | 11/1981 | (EP) . |
| 0 111 467 | 6/1984 | (EP) . |
| 293892 | 7/1928 | (GB) . |
| 52-45595 | 4/1977 | (JP) . |
| 52-62189 | 5/1977 | (JP) . |
| 53-51662 | 5/1978 | (JP) . |

*Primary Examiner*—Hoa T. Le
(74) *Attorney, Agent, or Firm*—Burns, Doane, Swecker & Mathis, L.L.P.

(57) ABSTRACT

Granular absorbent products with low amounts of paper fiber are described. The absorbent products are made from recycled paper and include less than about 10% of paper fibers having a length sufficient to be retained on a 100 mesh screen. A process for making such granular absorbent products is also provided. The granular absorbents are useful for absorbing liquids spilled on the floor, and are crushable when walked on to provide greater resistance to slipping, and yet have a high resistance to attrition.

6 Claims, 1 Drawing Sheet

U.S. PATENT DOCUMENTS

| | | |
|---|---|---|
| 4,311,115 | 1/1982 | Litzinger . |
| 4,334,984 | 6/1982 | Vagac et al. . |
| 4,341,100 | 7/1982 | Cortigene . |
| 4,343,680 | 8/1982 | Field et al. . |
| 4,343,751 | 8/1982 | Kumar . |
| 4,356,060 | 10/1982 | Neckermann et al. . |
| 4,374,794 | 2/1983 | Kok . |
| 4,378,756 | 4/1983 | Whiteman . |
| 4,407,231 | 10/1983 | Colborn et al. . |
| 4,409,925 | 10/1983 | Brundrett et al. . |
| 4,438,263 | 3/1984 | Morse . |
| 4,458,629 | 7/1984 | Gerber . |
| 4,459,368 | 7/1984 | Jaffee et al. . |
| 4,492,729 | 1/1985 | Bannerman et al. . |
| 4,495,482 | 1/1985 | Philipp . |
| 4,497,688 | 2/1985 | Schaefer . |
| 4,537,877 | 8/1985 | Ericsson . |
| 4,560,527 | 12/1985 | Harke et al. . |
| 4,619,862 | 10/1986 | Sokolowski et al. . |
| 4,621,011 | 11/1986 | Fleischer et al. . |
| 4,664,064 | 5/1987 | Lowe . |
| 4,712,508 | 12/1987 | Lowe . |
| 4,721,059 | 1/1988 | Lowe et al. . |
| 4,734,393 | 3/1988 | Lowe et al. . |
| 4,832,700 | 5/1989 | Kaspar et al. . |
| 4,888,092 | 12/1989 | Prusas et al. . |
| 4,915,821 | 4/1990 | Lamort . |
| 4,930,443 | 6/1990 | Lowe, Jr. et al. . |
| 4,931,139 | 6/1990 | Phillips . |
| 4,983,258 | 1/1991 | Maxham . |
| 5,002,633 | 3/1991 | Maxham . |
| 5,019,564 | 5/1991 | Lowe et al. . |
| 5,094,604 | 3/1992 | Chavez et al. . |
| 5,146,877 | 9/1992 | Jaffee et al. . |
| 5,176,822 | 1/1993 | Iwashige et al. . |
| 5,196,473 | 3/1993 | Valenta et al. . |
| 5,282,575 | 2/1994 | Krulick et al. . |
| 5,352,780 | 10/1994 | Webb et al. . |
| 5,358,607 | 10/1994 | Ellis . |
| 5,807,465 * | 9/1998 | Knapick et al. ............ 162/100 |
| 5,888,345 * | 3/1999 | Knapick et al. ............ 162/109 |
| 6,019,873 * | 2/2000 | Knapick et al. ............ 162/189 |

* cited by examiner

FLOOR ABSORBENT GRANULAR PRODUCT COMPRISING KAOKIN CLAY AND CELLULOSE FIBERS

RELATED APPLICATIONS

This application is a divisional of application Ser. No. 09/042,011, filed Mar. 13, 1998, now U.S. Pat. No. 6,019,873 which is a continuation-in-part application of application Ser. No. 08/929,601 filed Sep. 15, 1997, now U.S. Pat. No. 5,888,345 which is a continuation-in-part of application Ser No. 08/857,302 filed May 16, 1997, now U.S. Pat. No. 5,807,465 which is a continuation of application Ser. No. 08/482,843 filed Jun. 7, 1995, now abandoned, which is a continuation-in-part of application Ser. No. 08/118,186 filed Sep. 9, 1993, now abandoned. The subject matter of these prior patent applications is incorporated herein as if fully set forth.

FIELD OF THE INVENTION

The present invention relates to floor absorbent materials for absorbing water, oil and other liquids from a floor.

BACKGROUND OF THE INVENTION

When paper such as ledger or magazine paper is recycled by first breaking the paper down into a pulp slurry containing its individual components, long cellulose fibers are recovered that are useful for making tissue or other paper products. The slurry also contains a significant amount of other materials including primarily kaolin clay and short cellulose fibers which are not useful for making tissue. In an effort to make the maximum use of materials in the pulp slurry, various products have been developed.

One of the products that has been developed is a granular absorbent product that is made by a process that is known as the KAOFIN process and is described in U.S. patent application Ser. No. 08/852,419, filed May 8, 1997, now U.S. Pat. No. 5,882,480 which is incorporated herein by reference for its disclosure of the process for making absorbent granules. The granular product of this process is described in our copending applications, Ser. No. 08/857,302 filed May 16, 1997 now U.S. Pat. No. 5,807,465; and Ser. No. 08/929,601 filed Sep. 19, 1997, now U.S. Pat. No. 5,888,345 which are incorporated herein by reference for a disclosure of the granular absorbent product made by the KAOFIN process.

Desirable characteristics for granular absorbent products include a high rate of absorption of liquids, a high bulk density, and a high resistance to attrition. For example, U.S. Pat. No. 4,343,751 (the '751 patent) discloses a process for making absorbent pellets from clay that may be used as a floor absorbent. The '751 patent discloses the use of paper sludge in amounts between ten percent and fifty percent of the total mass of the agglomerated solids. However, the absorbency is less than ideal as seen in the examples which include pellets having 50% paper sludge and 50% clay fibers, a bulk density of 38 lbs/ft and only 78% absorbency (see Chart 2, sample 008).

Another example is disclosed in U.S. Pat. No. 5,019,564 (the '564 patent) which is directed to non-clay agricultural granules. The granules are formed by the agitative agglomeration of a plant fiber slurry and resembles a clay granule in all respects except for its chemical inertness.

Clay products, such as those described in the '751 patent, have the disadvantage of low absorbency when mixed with paper sludge, and relatively high attrition rates when the fiber content is low, as described in the '564 patent. When used as a floor absorbent, it is desirable that the granules retain their integrity after absorbing water or oil from the floor.

Another problem encountered with granular floor absorbents is that the granules are generally spherical and tend to roll across the floor. When a worker steps on the granules, there is a danger that the granules will cause the worker to slip and fall as the granules roll under his shoes.

SUMMARY OF THE INVENTION

It is therefore an object of the present invention to provide an improved granular absorbent product made from recycled waste paper and having a high absorbency, a high resistance to attrition, and a relatively high bulk density. It is a further objective of the present invention to provide a granular absorbent product that has a bulk density sufficiently high to provide an effective commercial absorbent that can be used to absorb oil and water and other liquids. It is another object of this invention to provide a granular absorbent that resists rolling when stepped on by a worker after it has been spread on the floor to absorb the liquid. Another object of the present invention is to provide a process for making such an improved granular absorbent product.

These objects are accomplished by the present invention which comprises a low fiber content granular absorbent product made from recycled paper and containing kaolin clay and paper fiber. The paper fiber contains less than about 10% by weight of fibers having a length greater than the width of the openings in a 100 mesh screen (0.149 inches) and an absorbency for water of at least 0.90 ml/g and resistance to attrition of at least 99%.

An important feature of this invention is that fibers suitable for papermaking, referred to generally as long fibers, are efficiently removed from the pulp slurry, so that the secondary stream contains a major portion of fibers that are too short for papermaking, referred to generally as short fibers. The procedure utilized for determining fiber length is described in TAPPI method T233 (1995). Using this procedure, it was determined that less than 10% by weight of the fibers in the secondary stream were retained on the 100 mesh (U.S. standard) screen, which has openings of 0.149 mm.

The preferred granular floor absorbent of the present invention is crushable when walked on by a worker and has a coefficient of friction greater than 0.50, but has a resistance to attrition of at least 99%.

BRIEF DESCRIPTION OF THE DRAWINGS

A preferred embodiment of this invention is disclosed in the following description and illustrated in the accompanying drawings, in which.

DETAILED DESCRIPTION

Figure 1:
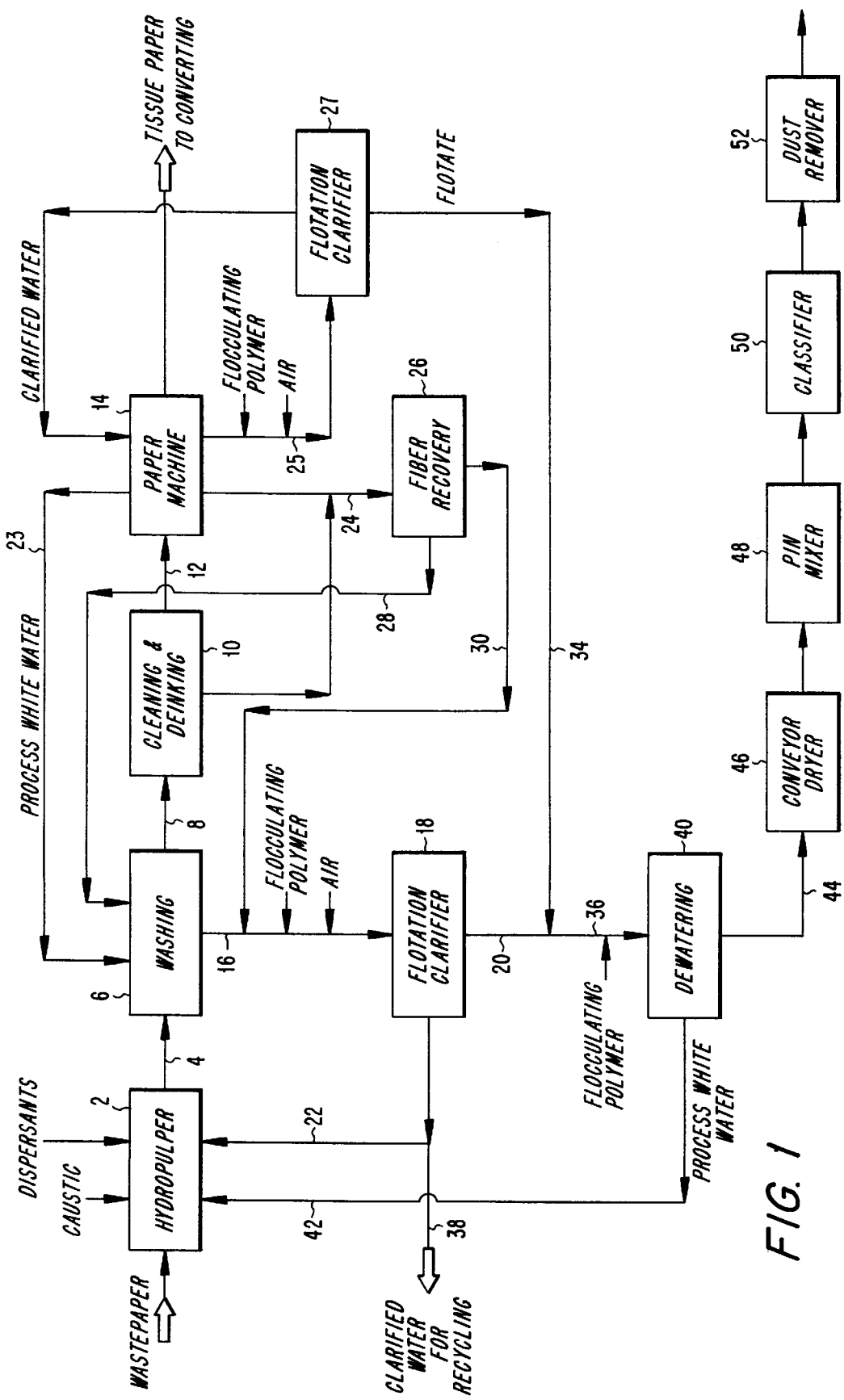
FIG. 1 is a schematic diagram of a preferred embodiment of the process of this invention for making an improved absorbent granular product.

The process of this invention utilizes waste paper that is collected from offices or other sources that contain primarily recyclable paper grades, including magazines (with clay-based coatings) and writing grades (with laser print, photocopier print and other inks).

Referring to FIG. 1, waste paper, such as office waste paper and magazines, is supplied to a hydropulper 2 along with water, caustic agents, such as sodium hydroxide, and dispersants to separate the fiber from the other components of the waste paper and to form a pulp slurry. Plastics, debris and other foreign objects are removed by conventional means. The pulp slurry from the hydropulper, which contains more than 95% water, passes through a pipe 4 to a washer 6 where several conventional washing steps are performed. In the washer 6, the slurry flows over wire screens where fibers having a length sufficient for papermaking are retained on the screens and the secondary stream containing short fibers and other solids passes through the screen. The stream of fibers useful for papermaking is conducted out of the washer through a pipe 8. The screens have slotted openings of about 100 to 300 microns in width. Fibers having a sufficient length to be suitable for papermaking preferably collect on the surface of the screens, while small particles, such as kaolin clay, short cellulose fibers, cellulose fines and other suspended solids pass through the screens in a secondary stream. Some of the fibers suitable for papermaking may also pass endwise through the screens into the secondary stream. The fibers that are retained on the screen are subject to further cleaning, de-inking and processing, indicated at 10, before being supplied through a pipe 12 to a papermaking machine 14.

The secondary stream from the wire screen washer 6 flows through the pipe 16 to a dissolved air flotation clarifier 18 in the form of a slurry typically containing less than 1.5% solids, including cellulosic fines, short cellulose fibers and inorganic materials. The percentages stated in this specification are weight percentages unless specifically stated otherwise. Typically about 50% of the solids by weight are inorganic materials such as kaolin clay, calcium carbonate and titanium dioxide. The remaining solids are organic materials, typically cellulose fibers which would pass through a 100 mesh screen, cellulose fines, some sugars, tannins and lignins.

Prior to introduction of the mixed slurry to the dissolved air flotation clarifier 18, a flocculating polymer and air are added as indicated in FIG. 1. Suitable dissolved air flotation clarifiers are commercially available. A flocculating polymer, such as Drewfloc® 441 or 442 from Ashland Chemical Co., or Calgono TRP 945, and air are added to the secondary stream in the pipe 16 before it enters the clarifier. The slurry fills the clarifier 18, and the flocculated suspended solids float on the air bubbles to the surface of the clarifier. At this point, the mat of solids, which has a consistency of 3–7% is skimmed or raked off the surface and removed from the clarifier through the pipe 20. Some portion of clarified water from the clarifier 18 is conducted back into the hydropulper 2 through the pipe 22 to be reused.

The stream from the clarifier 18 flows through the pipe 20, and a second flocculating polymer, such as Drewfloc® 453 from Ashland Chemical Co., is added to the slurry to promote dewatering in a dewatering press 40. The dewatering press may be a belt press or a series of presses, such as a belt press followed by a nip press or a screw press to achieve the desired solids content in the filter cake produced in the dewatering press or presses. The belt press 40 can be any suitable commercially-available unit, such as a Belt Filter Press from Komline Sanderson. Depending on the volume of material being processed, several belt presses may be arranged in parallel to provide the desired capacity. Process white water from the belt press 40 is preferably conducted to the hydropulper through a pipe 42. If a series of presses is used so that the belt press is followed by a nip press or a screw press, the dewatered cake may have a solids content as high as 55%.

As shown in FIG. 1, the effluent stream includes a process white water stream 23 from the papermaking machine 14, an overflow stream 24 which would previously have been discharged to a sewer, and a white water stream 25. The process white water is returned to the washer 6. The overflow stream 24 is supplied to a fiber recovery process 26 where the stream passes through screens that separate the long fibers in a similar manner to the washer 6. Long fibers with water are supplied through the pipe 28 from the fiber recovery unit 26 to the washer 6. A slurry essentially free of papermaking fibers flows through the pipe 30 to the pipe 16 upstream from the addition of the flocculating polymer and air. The white water stream 25 from the papermaking machine is supplied to another flotation clarifier 27 where the flocculated suspended solids are removed in the same manner as in the clarifier 18. The Rotate from the clarifier 27 flows through the pipe 34 to mix with the fotate from the clarifier 18 to form a single concentrated stream in the pipe 20. The flocculating polymer is added to the flotate in the pipe 20 upstream from the belt press 40.

The filter cake is discharged from the belt press 40 in the form of a sheet of wet particles which readily falls apart. At the outlet of the belt press, the filter cake has 35–45% solids, preferably 36–40% solids. If a nip press or screw press is used for further dewatering of the cake from the belt press, the solids content of the cake may be increased up to 55%. The filter cake is conveyed by means of a screw conveyor 44 from the belt press 40 or the secondary press, if used. The filter cake breaks up as it passes through the screw conveyor 44.

From the screw conveyor 44, the granulated but still moist material (35–55% solids) is directed into a conveyor dryer 46. The conveyor dryer 46 preferably includes a housing through which the granular material moves while supported on a moving belt. The belt is porous and hot air is circulated though the belt to dry the granules. A preferred minimum solids content is 90% by weight, and preferably greater than 95%.

The dried granules are conveyed from the conveyor dryer 46 to a pin mixer 48, such as the Turbulator from Ferro-Tech. The pin mixer 48 has a cylindrical shell and a rotatable shaft mounted on the central axis of the shell. The shell is stationary and is supported on a frame so that the central axis of the shell is substantially horizontal. The shaft has radial pins that are spaced from the interior wall of the shell. The dried granules from the conveyor dryer 46 are deposited in the shell at one end of the shell. The rate of filling of the shell should be adjusted so that the cake material substantially fills the volume of the shell. A surfactant such as Surfonic L 24690, from Huntsman Chemical, or any other suitable wetting agent is added to the granules at the rate of 5–10 lbs./dry tar of granules.

The granules are advanced through the pin mixer by the rotating pins. It is believed that the granules develop slight cracks that allow it to be crushed under foot, and yet retain a high resistance to attrition during shipment.

After the pin mixer 48, the granules, still warm from the dryer 46, pass through a vibrating screen classifier 50 to remove granules that are too large or too small for ease of handling. It is advantageous to pass the granules through a dust removal device 52 to remove any remaining dust particles and loose fibers. For dust removal, it is preferred to use a fluidized bed deduster, such as is manufactured by Witte, Inc. of Washington, N.J. The deduster removes balls of fiber that form in the conveyor dryer and pin mixer. These fiber balls are preferably returned to the hydropulper for recycling. The presence of the fiber balls in the granules is unsightly, but does not hinder the effectiveness of the granules.

The granules made in accordance with this process are readily crushable when placed on the floor and stepped on by a worker. The following table shows a comparison of the crushable granules of this invention (referred to as CRUSHABLE WORKFORCE) with the absorbent granules made by the process of our copending patent application Ser. No. 08/929,601 now U.S. Pat. No. 5,888,345 (referred to as WORKFORCE), and a proprietary clay absorbent material:

|  | WORK-FORCE | CRUSHABLE WORKFORCE | CLAY |
| --- | --- | --- | --- |
| DENSITY #/cu. Ft. | 28.0 | 27.5 | 34.3 |
| SIEVE ANALYSIS | | | |
| 6 mesh | 1.9 | 4.9 | 0.61 |
| 12 mesh | 22.4 | 22.9 | 46.9 |
| 16 mesh | 25.6 | 19.3 | 27.7 |
| 20 mesh | 25.1 | 19.9 | 17.9 |
| 30 mesh | 17.5 | 16.4 | 5.1 |
| 40 mesh | 6.6 | 10.4 | 1.1 |
| 60 mesh | 0.9 | 5.6 | 0.34 |
| <60 mesh | 0.02 | 0.6 | 0.29 |
| WATER ABSORPTION ml/gr | 0.94 | 1.06 | 0.88 |
| OIL ABSORPTION ml/gr | 0.73 | 0.84 | 0.75 |
| COEFFICIENT OF FRICTION | | | |
| AS IS | 0.50 | 0.50 | 0.55 |
| CRUSHED | 0.50 | 0.59 | 0.62 |
| RESISTANCE TO ATTRITION | 99.8 | 99.8 | 91.3 |

The values stated in the above table are an average of various samples of the granules made by the process as described above.

The coefficient of friction was measured according to ASTM Standard C 1028-89 using an ASM 725 static coefficient of friction tester manufactured by American Slip Meter Co. The accepted standard for non-hazardous materials is a coefficient of friction of at least 0.50, ASTM D 2047-93.

The crushed samples were made by placing a sample of granules made by the process described above, and walking on the samples to cause some or all of the granules to disintegrate. The crushed granules were then tested as explained above.

Resistance to attrition of the granules is between 95 and 100%. This percentage is based on the following test procedure. A weight of 75 grams of sample is shaken on a limiting screen (60 mesh) for ten minutes and 50 grams of the material retained is then shaken in a pan for ten minutes with ten steel balls (⅝" in diameter). The entire 50 gram sample is then shaken on the limiting screen (60 mesh) for ten minutes. The percentage of the original 50 grams retained on the limiting screen is the resistance to attrition cited above.

The granular product of this invention is particularly useful as a floor absorbent because it has a relatively high bulk density as compared to the higher fiber content granules. They nevertheless have a high resistance to attrition.

While this invention has been illustrated and described in accordance with preferred embodiments, it is recognized that variations and changes may be made therein without departing from the invention as set forth in the claims.

We claim:

1. A granular absorbent material comprising: a plurality of irregular, generally spherical granules containing kaolin clay and cellulose fibers, less than 10% of the cellulose fibers in the granules having a size to be retained on a 100 mesh screen, the granules having a water absorption capacity of at least about 0.90 ml/g, and a bulk density of at least 24 lbs/ft$^3$, at least some of the cellulose fibers communicating between the surface of a granule and the interior of the granule, the granules having a low resistance to crushing and a resistance to attrition of at least 95%.

2. The granular absorbent material of claim 1 wherein the granules retain their integrity when wet.

3. The granular absorbent material of claim 1 wherein the granules have a porous outer surface.

4. The granular absorbent material of claim 1 wherein the granules have a size distribution wherein less than 60% of the granules have a size of 16 mesh or greater.

5. The granular absorbent material of claim 1 wherein the granules have a capacity for the absorption of oil of at least about 0.80 ml/g.

6. A granular absorbent material comprising: a plurality of irregular generally spherical granules containing kaolin clay and cellulose fibers, less than 10 percent of the fibers in the granules having a size to be retained on a 100 mesh screen, the granules having a resistance to attrition of at least 95 percent and being crushable under foot when spread on a floor, the granules when crushed having a coefficient of friction of about 0.59.

* * * * *

UNITED STATES PATENT AND TRADEMARK OFFICE
CERTIFICATE OF CORRECTION

PATENT NO. : 6,214,465 B1
DATED : April 10, 2001
INVENTOR(S) : Edward G. Knapick; Brent Willemsen; Ernest P. Wolfer; Michael C. Bonin It is certified that error appears in the above-identified patent and that said Letters Patent is hereby corrected as shown below:

Under (75) Inventors, please insert the fourth inventor,
-- Michael C. Bonin, Cedar Knolls, New Jersey --

Signed and Sealed this

Twenty-eighth Day of August, 2001

Attest:

*Attesting Officer*

NICHOLAS P. GODICI
*Acting Director of the United States Patent and Trademark Office*